March 31, 1970  MASAYOSHI KAWARABAYASHI ET AL  3,503,679
STEP-AND-REPEAT PHOTOCOMPOSING MACHINE
Filed Nov. 28, 1967                                      3 Sheets-Sheet 2
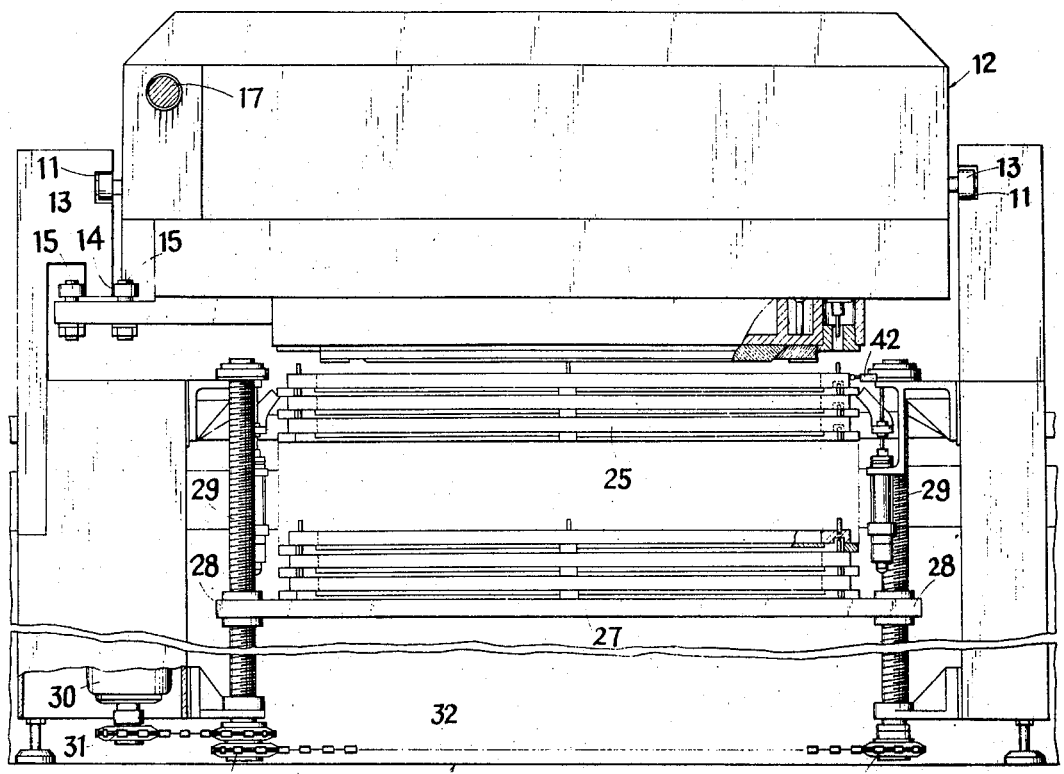
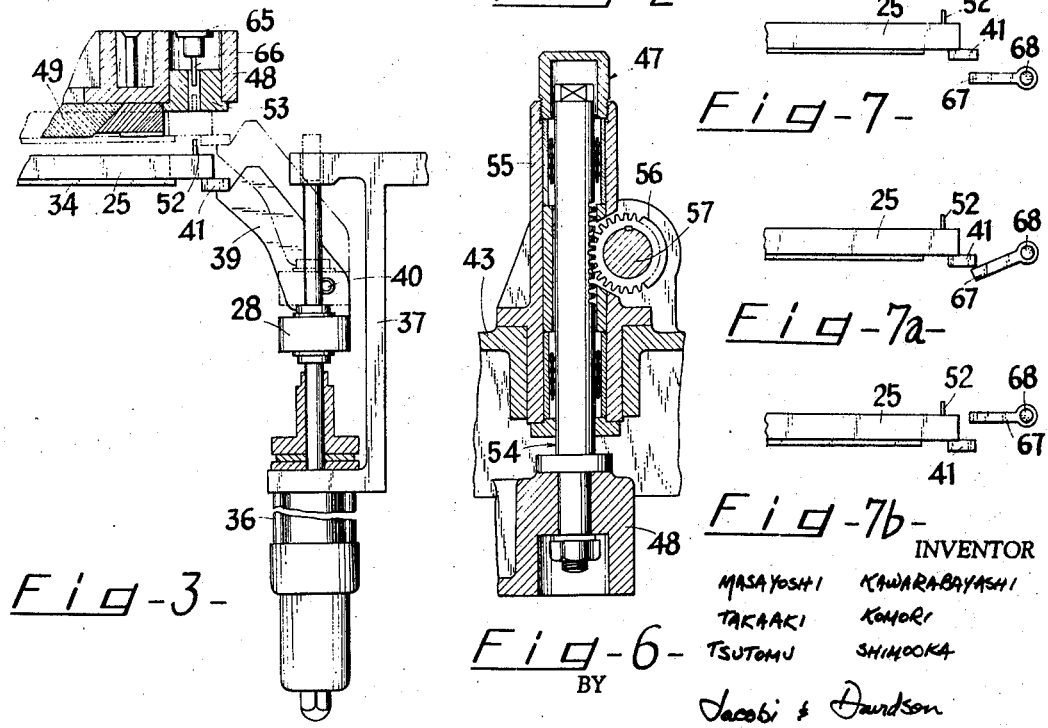
INVENTOR
MASAYOSHI KAWARABAYASHI
TAKAAKI KOMORI
TSUTOMU SHIMOOKA
BY
Jacobi & Davidson
ATTORNEY March 31, 1970  MASAYOSHI KAWARABAYASHI ET AL  3,503,679
STEP-AND-REPEAT PHOTOCOMPOSING MACHINE
Filed Nov. 28, 1967  3 Sheets-Sheet 3
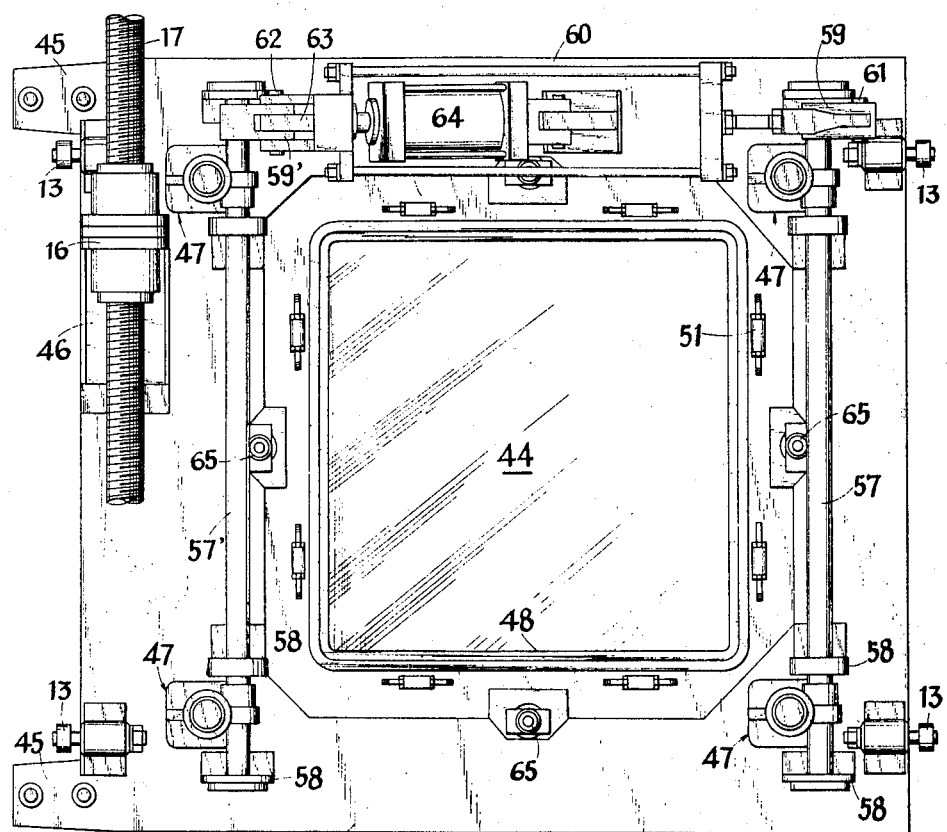
Fig-4-
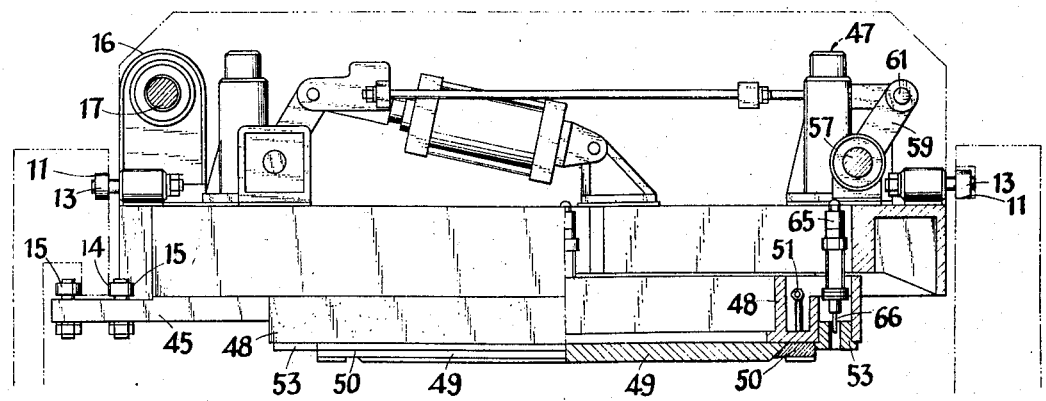
Fig-5-
INVENTOR
MASAYOSHI KAWARABAYASHI
TAKAAKI KOMORI
TSUTOMU SHIMOOKA
BY Jacobi & Davidson
ATTORNEY

United States Patent Office 3,503,679
Patented Mar. 31, 1970

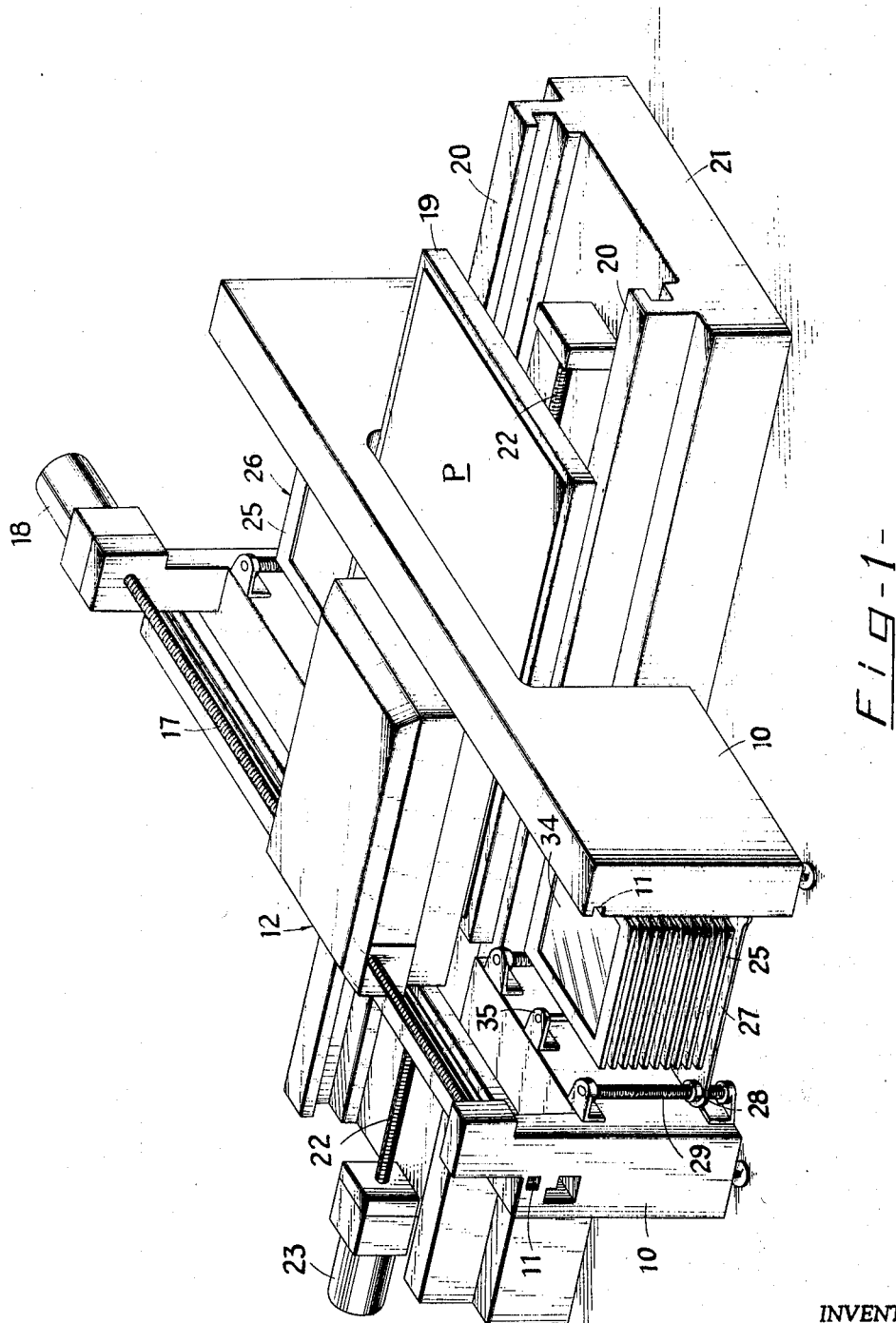

3,503,679
STEP-AND-REPEAT PHOTOCOMPOSING MACHINE
Masayoshi Kawarabayashi, Takatsuki, Takaaki Komori, Hikone, and Tsutomu Shimooka, Kyoto, Japan, assignors to Dainippon Screen Seizo Kabushiki Kaisha (Dainippon Screen Manufacturing Company, Limited), Kamikyo-ku, Kyoto, Japan
Filed Nov. 28, 1967, Ser. No. 686,042
Claims priority, application Japan, Dec. 5, 1966, 41/79,351
Int. Cl. G03b 27/08
U.S. Cl. 355—53                    10 Claims

ABSTRACT OF THE DISCLOSURE

A step-and-repeat photocomposing machine having a magazine for holding a plurality of framed originals stacked therein and a receptacle for receiving the originals. The carriage of the photocomposing machine automatically picks up an original from the magazine and moves the original into position for exposure on the platen of the machine. After repeated exposures, the carriage moves to the position above the receptacle and releases the original thereat. Then the carriage moves back to the magazine for receiving next original to be duplicated. The images of the originals are automatically transferred, by changing the originals in sequence, to a single photosensitized material which is located on the platen of the machine in accordance with a predetermined program.

---

This invention has for its object to provide an improved step-and-repeat photocomposing machine for preparing a single printing film or plate having different images repeated thereon by automatically loading the machine with negatives or positives in sequence.

Step-and-repeat photocomposing machines are used for transferring regularly or irregularly the image of original to a photosensitive film or plate. In conventional step-and-repeat photocomposing machines, the carriage of the photocomposing machine moves in one direction over the platen of the machine repeating the exposure of the photosensitive film or plate for preparing a pringing film or plate having a plurality of the images of the original thereon. When the duplication of images by a particular original has been completed, the used original and the exposed film or plate are manually removed from the machine and a new set of orginal and film or plate are mounted on the machine for preparing a separate printing film or plate having a plurality of the new original. The machine is inoperative when each original and photosensitive film or plate are being manually loaded onto the machine.

According to the present invention, the photocomposing machine has a magazine loaded with a stack of originals and a receptacle of originals arranged in the position opposite to each other in the machine. The carriage of the machine has means for controllably picking up an original from the stack in the magazine, while the magazine lifting the original to a predetermined position to be picked up by the carriage. Each original is held by the carriage and moves over a photosensitized material located on the platen of the machine. Then, exposure occurs. When the required exposures have been completed, the carriage moves to the position above the receptacle and discharges the original into the receptacle. The receptacle has means for controllably receiving the original. Then the carriage returns to the position above the magazine for removing a new original therefrom, while the platen being movable in the direction perpendicular to the movement of carriage for providing a new area for exposure. The photocomposing machine of the invention may operate to prepare a single printing film or plate having several images without stopping the operation of the machine for changing originals. The machine of the invention may be incorporated with a suitable control unit for automatically operating the machine for loading each original to the carriage of the machine, for exposing the photosensitized material, and for changing the originals.

The above objects, features and advantages of the present invention will become more fully apparent from the following detailed description, reference being made to the accompanying drawings in which:

FIG. 1 is a perspective view of a step-and-repeat photocomposing machine embodying the invention;

FIG. 2 is a sectional front view of the magazine with a number of original copies mounted therein;

FIG. 3 is an enlarged side elevational view of a device for lifting the uppermost original holder for mounting to the carriage;

FIG. 4 is a top plan view of the carriage with its housing and light source removed;

FIG. 5 is a sectional view on line 5—5 of FIG. 4;

FIG. 6 is an enlarged sectional view on line 6—6 of FIG. 4; and

FIGS. 7, 7a and 7b are diagrammatic views, respectively, showing the relationships between a used original holder and a switch means for operating a device for lowering the original holder in the receptacle.

In FIG. 1 there is illustrated more or less schematically one form of a step-and-repeat photocomposing machine, constructed in accordance with the principles of the invention, for transferring sequentially a series of negative or positives from a magazine into register with a photosensitive film or plate located on the platen of the machine in accordance with a predetermined program. Reference numeral 10 are applied to a pair of frame members of the machine, each having a rail 11 for supporting laterally the carriage 12 by means of rollers 13 (FIG. 2) mounted to the carriage. One of the frame members 10 has a second rail 14 for guiding the movement of carriage 12 therealong by the engagement with rollers 15 (FIG. 2) which are carried by the carriage 12. The carriage 12 is provided with a nut member 16 (FIG. 4) which engages with a lead screw 17 coupled with a reversible motor 18. The platen 19 has rollers (not shown) which ride on rails 20 laid on machine frame 21 along the axes perpendicular to the guide rail 14 for carriage 12. The platen 19 is provided with suitable means for holding a photosensitive material, e.g., film or plate P, on the surface thereof, such as by adhesive tapes or vacuum suction means. A second lead screw 22 and reversible motor 23 are adapted to drive the platen 19 along the axis perpendicular to the axis of the movement of carriage 12. Reference numeral 24 denotes the magazine for containing a number of original holders 25 in the space formed between the frame member 10. Provided at the position opposite to the magazine 24 and in the space between the frame members 10 thereat, is a receptacle 26 for the used original holders.

The magazine 24 consists of the opposite inner wall surfaces of machine frames 10 and a base 27. The base 27 has at the respective corners thereof collars 28 screwed into vertical screw-threaded rods 29 which are carried by the frames 10. A motor 30 (FIG. 2) operates a sprocket wheel 31 engaged with, by means of a chain 32, the sprocket wheel 33 at the lower ends of screw-threaded rods 29 which cause collars 28 to move the base 27 upwards toward the top of magazine 24. The magazine 24 is adapted to contain a number of original holders 25 by which the original copies 34 are framed respectively.

Located at the upper end portion of magazine 24 are means 35 for supporting and lifting the uppermost original holder towards the carriage 12 for mounting thereto. The supporting and lifting means 35 has an air cylinder 36 carried by a bracket member 37 which is rigidly secured to the frame 10 of machine. Supported slidably by the bracket 37 is a piston 38 which is actuated by air cylinder 36 by supplying compressed air thereto. A suitable source of compressed air and an operating device are connected to the air cylinder 36 so that the piston 38 may be raised or lowered at will. As shown in FIG. 3, a latch 39 is pivoted to the piston 38 at 40 in such a manner that the upper free end of latch 39 is normally biased by gravity or by suitable spring means towards the position to engage with the lug 41 of original holder 25.

The motor 30 is driven by closing a suitable starter switch (not shown) and raises the magazine 24 until the uppermost original holder 25' reaches a predetermined height where the original holder operates a limit switch 42 so that the circuit of motor 30 is opened to stop its movement. Before the upper most original holder 25' actuates the limit switch 42, the lug of holder 25' comes in contact with the latch 39 and causes to turn the latch about its pivot 40 in the clockwise direction in FIG. 3. When the lug 41 has passed, relatively, over the free end of latch 39, the latch returns to its biased original position where the free end of latch 39 is situated beneath the uppermost original holder 25'. Thus the uppermost original holder 25' will be supported by latches 39. Air cylinders 36 may then be actuated by a suitable control unit to drive the pistons 38 upwardly for lifting the latches 39 to the level where the uppermost original holder 25' can be picked up by the carriage 12.

Referring now to FIGS. 4 and 5, the carriage 12 includes a platform 43 having a central square opening 44 through which the exposure is occured by a light source (not shown) provided at the upper portion of the carriage. The platform 43 retains the previously described side rollers 13 and guide rollers 15. Guide rollers 15 are supported by the brackets 45 which extend laterally from the lower parts of platform 43. The rollers 15 wheel along the guide rail 14 and function to keep the movement of carriage 12 in straight on a line along the rail 14. Numeral 46 indicates the fixture of nut member 16 to the platform 43 of carriage 12. Provided upright to the positions near to the respective corners of platform 43 are supporting means 47 for a frame 48 which is adapted to carry the original holder 25 thereunder. The frame 48 has a glass plate 49 supported on the underside thereof by a protruding member 50 of the frame. The frame 48 carries the original holder 25 during the photocomposing operation thereof and is adapted to remove the original holder from the magazine 24. For this purpose, the frame 48 is provided with vacuum pipe connections 51 arranged at regular intervals along the square of frame 48. Each of vacuum pipe connections 51 connects to a port on the underside of protruding member 50. When a vacuum is applied to the pipe connections 51, suction is created at the site of the port. The port is provided with a suitable sealing member so that it can keep a sufficient vacuum suction at the port for picking up and carrying the original holder. Such vacuum suction means may be substituted by an electromagnetic means by providing magnets on the underside of frame 48 and magnetic materials on the surface of original holder 25. An electric circuit and switch means may operate the magnets to induce a magnetic force for attracting the original holder.

The original holder 25 have at the surface thereof pins 52 for registering the original holders with a predetermined point with respect to the carriage 12 by engagement with bushings 53 provided on the underside of frame 48.

Thus the original-mounted carriage 12 moves over the platen 19. The carriage 12 has a light source (not shown) to expose the photosensitive film or plate P. When the exposure is effected, the original is lowered to bring into intimate contact with the photosensitive film or plate P. This operation is accompanied by the supporting means 47 for frame 48. Each of supporting means 47 includes a rack member 54 secured at the lower end thereof to the frame 48 (FIG. 6). The rack member 54 is slidably mounted into an upstanding housing 55 fixed to the platfor 43. Engaged with the rack member 54 is a pinion 56. A pair of shafts 57, 57' extend along the right and left sides of platform 43 in FIG. 4 and are journalled in bearings 58, respectively, which are fixed to the platform. The shaft 57 on the right side in FIG. 4 is a common shaft for a pair of pinions 56 which are engaged with the rack members of supporting means 47 on the right side of platform 43, and the shaft 57 functions to move synchronously the rack members. Similarly, the shaft 57' on the left side in FIG. 4 is adapted to move synchronously the rack members on the left side of the platform through the respective pinions on that side. The shafts 57 and 57' have at an end thereof, respectively, levers 59 and 59' which are linked by means of a connecting rod member 60 terminally pivoted to the levers at 61 and 62, respectively. Attached to the pivot 67 is a piston 63 which is driven by an air cylinder 64 mounted on the platform 43. By supplying a compressed air to the cylinder 64, the piston 63 turns the levers 59 and 59' in the same direction, which in turn rotate the pinions 56 through shafts 57, 57' and causes the rack members 54 to lower collectively the frame 48. Thus the original copy 34 which is held on the underside of glass plate 49, is brought into intimate contact with the photosensitive film or plate P on platen 19 and is ready to produce sharp and clean printing by exposure thereof. After exposure, the piston 63 is reversed to cause the pinion shafts 57, 57' to lift the rack members 54 collectively for keeping the original-mounted frame 25 apart from the film-mounted platen 19. Then, motor 18 operates to move the carriage 12 over the platen 19 to situate a new position for printing; and the above-mentioned operations are repeated to duplicate the image of original 34 contained in the original holder 25 on the photosensitive film or plate P.

When the required exposures of a particular original has been completed, the carriage 12 is driven by motor 18 to move to the position above the receptacle 26. Then the vacuum pipe connections 51 are released from vacuum source for dropping the original holder 25 by gravity.

In order to accelerate the release of original holder 25 from the carriage 12 at the receptacle 26, the frame 48 is preferably provided with electromagnetic plunger means 65 of which plunger rod 66 are slidably inserted into the bushings 53, respectively. When the original holder 25 is to be released from the carriage 12, the plunger means 65 are electromagnetically energized to drive their plunger rods 66 toward the register pins 52 of original holder 25 so that the pins are forced out of the respective bushings. Thus the original holder 25 will be positively released from the carriage 12.

The receptacle 26 is constructed substantially same with that of the magazine 24, provided that the supporting means 35 for original holders 25 are omitted from the unit of receptacle 26. The receptacle has a base member similar to the base 27 of magazine 24 and is provided with a driving mechanism for lowering the base member in receptacle 26. This driving mechanism may be a set of screw-threaded rods, motor and chain drive similar to the rods 29, motor 30 and chain 32 of magazine 24.

The driving mechanism for lowering the base member in receptacle 26 further includes a switch lever 67 having its root end pivotally mounted to a structural part of the frame of machine at 68. FIG. 7 shows that the original holder 25 is just about releasing from the carriage 12. When the original holder 25 falls on the switch lever 67, the lever 67 turns to the position as shown in FIG. 7a where a circuit of the motor for operating the driving mechanism of receptacle 26 is closed to operate thereof.

Then the base member of receptacle 26 begins to lower. When the original holder 25 has passed over the free end of switch lever 67 to the position as shown in FIG. 7b, the circuit of the motor for operating the driving mechanism is opened to stop further lowering of the base member. The operation of switch lever 67 is timed to drive the motor in such a manner that the base member of receptacle 26 is lowered for the distance corresponding to the thickness of the original holder so as not to cause unnecessary dropping for a long distance which is liable to damage the original holder.

Then the motor 18 operates to reverse the rotation of lead screw 17 for moving the carriage 12 to the position above the magazine 24, while the motor 23 operates to have the platen 19 stepped for providing a new area of photosensitive film or plate P. Thus the machine is ready to start next printing with a new original by picking up the new original from the magazine 24. The above described operation and process for picking up a new original from the magazine and for transferring repeatedly the image of original to the photosensitized material on the platen and for discharging the used original into the receptacle may be effected automatically by incorporating a suitable control unit, such as a card- or tape-controlled computer, into the machine. Thus the machine may be automatically operated in accordance with a predetermined program.

What is claimed is:

1. A step-and-repeat photocomposing machine comprising a container means for holding a plurality of framed originals stacked in a predetermined sequence, means for controllably lifting the stack of originals in said container means, a carrier means for automatically removing said originals in sequence from said container means and for moving said originals over a platen which is movable in the direction perpendicular to the movement of said carrier means, said carrier means including a light source for exposing a photosensitized material located on said platen, means for automatically positioning said carrier means to predetermined positions on said photosensitized material for transferring the image of said original in accordance with a predetermined program, a receiving means arranged in the position opposite to said container means with respect to said platen for receiving used originals therein, said carrier means being adapted to automatically discharge said original into said receiving means, and means for controllably lowering said receiving means in response to the thickness of each original.

2. A step-and-repeat photocomposing machine as claimed in claim 1 wherein said means for controllably lifting the stack of originals includes a base member on which a plurality of framed originals are stacked and a motor means for driving said base member upwardly, and a limit switch means for stopping the drive of said motor means when the uppermost original has reached the top of said container means.

3. A step-and-repeat photocomposing machine as claimed in claim 1 wherein said means for controllably lifting the stack of originals includes further at least two pneumatically actuated devices for removing the uppermost original from the stack of original and for lifting said uppermost original to the position to be picked up by the carrier means.

4. A step-and-repeat photocomposing machine as claimed in claim 1 wherein said carrier means include vacuum suction means for holding the original on the underside of a vertically movable frame member.

5. A step-and-repeat photocomposing machine as claimed in claim 1 wherein said carrier means include electromagnetic means for holding the original by the magnetic attraction on the underside of a frame member which is movably supported and suspended by said carrier means.

6. A step-and-repeat photocomposing machine as claimed in claim 4 wherein said carrier means includes pneumatically actuated devices for lowering the frame, which holds the original thereunder, towards the surface of said photosensitized material on the platen of the machine, whereby the original is brought into intimate contact with said photosensitized material when the latter is exposed.

7. A step-and-repeat photocomposing machine as claimed in claim 1 wherein the frame of the original has at least two register pins which are adapted to mount said original to a predetermined position with respect to said carrier means.

8. A step-and-repeat photocomposing machine as claimed in claim 1 wherein said receiving means for receiving the originals includes a base member which is mounted movably downwardly in said receiving means.

9. A step-and-repeat photocomposing machine as claimed in claim 4 wherein said carrier means includes further a driving means for releasing the original from the frame of said carrier means when said carrier means is positioned above said receiving means.

10. A step-and-repeat photocomposing machine as claims in claim 1 in which a control unit is incorporated therein to operate and process the machine automatically in sequence in accordance with a predetermined program.

References Cited

UNITED STATES PATENTS

| | | | |
|---|---|---|---|
| 3,472,591 | 10/1969 | Frohlidi | 355—53 |
| 1,131,657 | 3/1915 | Blair | 355—102 |
| 1,604,255 | 10/1926 | Blair | 355—102 |
| 2,200,365 | 5/1940 | Nickelsberg | 355—95 |
| 2,588,385 | 3/1952 | Hillmer et al. | 355—87 |
| 2,614,470 | 10/1952 | Hillmer et al. | 355—87 |

NORTON ANSHER, Primary Examiner

D. J. CLEMENT, Assistant Examiner

U.S. Cl. X.R.

355—87, 102